W. B. Read,
Cultivator.
No. 111,250. Patented Jan. 24, 1871.

Witnesses:
Phil. T. Dodge,
Henry A. Myggatt.

Inventor:
Wm. B. Read
by Dodge & Munn
Attys

UNITED STATES PATENT OFFICE.

WILLIAM BENJAMIN READ, OF GALLATIN, TENNESSEE.

IMPROVEMENT IN CULTIVATORS.

Specification forming part of Letters Patent No. 111,250, dated January 24, 1871.

*To all whom it may concern:*

Be it known that I, WILLIAM BENJAMIN READ, of Gallatin, in the county of Sumner and State of Tennessee, have invented certain Improvements in Hand-Cultivators, of which the following is a specification, reference being had to the accompanying drawings.

My invention relates to cultivators; and it consists in a novel manner of constructing an iron frame and so attaching shovels and handles thereto that the shovels may be secured at different distances apart and the handles adjusted to any desired height, and so, also, that the frame may be used either side up, and the shovels and handles attached thereto, so as to form a right or left hand cultivator, as desired.

Figure 1:
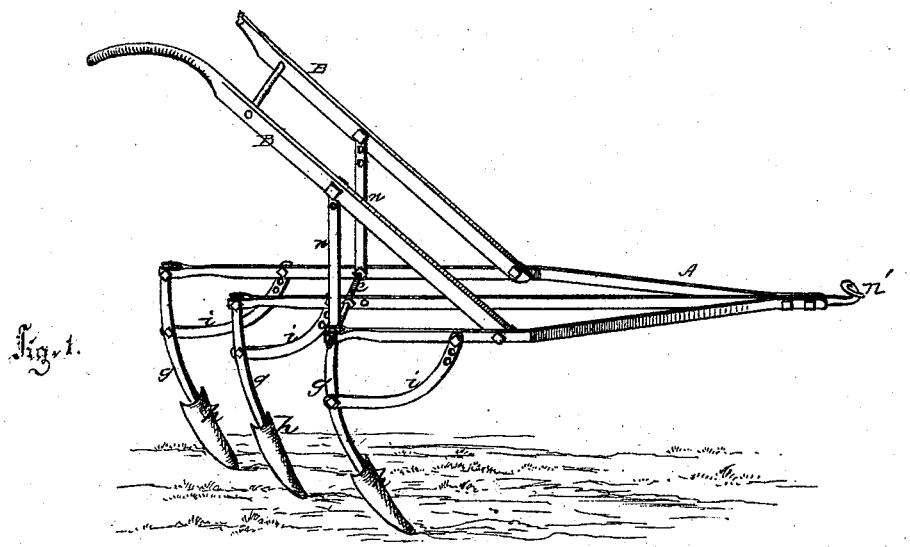
Figure 2:
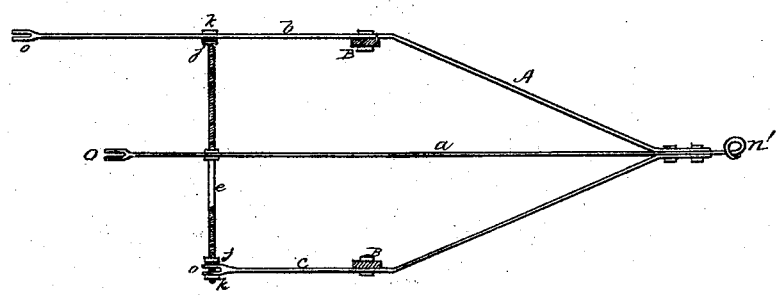
Figure 3:
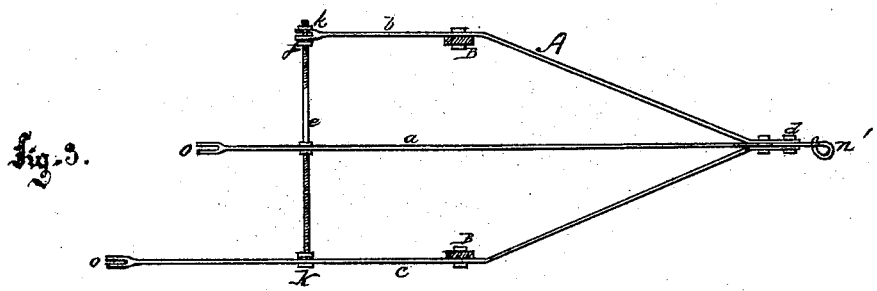

Figure 1 is a perspective view of my improved cultivator; Fig. 2, a top plan view of the frame arranged as a right-hand cultivator; Fig. 3, the same turned the opposite side up for a left-hand cultivator.

I construct the frame A of my cultivator in the manner shown in Figs. 1, 2, and 3, by taking a straight bar, $a$, and securing to each side, near its front end, the front ends of two bent bars, $b$ and $c$. The back end of each of these bars I shape into a forked head, $o$, and the front end of the middle bar, $a$, into a spiral hook, $n$, as shown. Through the rear end of bar $a$, I pass a rod, $e$, having a screw-thread cut upon it, as shown, and then turn onto this rod two nuts tightly against the opposite sides of bar $a$. I then screw onto each end of the rod, for a short distance, another nut, $j$, and then slip the bars $b\ c$, which are provided with holes for the purpose, onto the ends of the rod against the nut $j$, and screw nuts-$k$ onto the ends of the rod against the outside of the bars, as shown. In this manner the bars are held rigidly in position, but at the same time, by means of the nuts, rendered capable of adjustment to or from each other, the holes in the bars being made slightly larger than the rod $e$, to permit the adjustment, as described. The bars $a\ b\ c$, it will be seen, are of different lengths, so that their rear ends stand in a line oblique to the line of movement, so that the shovels, when attached thereto, stand one ahead of the next in the usual manner. In the forked end of each of the bars $a\ b\ c$, I pivot a standard, $g$, having a shovel, $h$, attached to its lower end, and midway of each standard pivot a brace, $i$, which extends forward and is attached to the corresponding bar of the frame, as shown. The forward ends of the braces $i$ are provided with a series of holes to allow the braces to be adjusted so as to vary the inclination of the shovels. To the bars $b\ c$, I attach handles B, and support their rear ends by bars $n$, which are attached to rod $e$, as shown. The bars $n$, I provide with a number of holes, so as to allow the handles to be fastened at different heights by passing the bolts which connect the bars to them through one or the other of these holes.

The drawings represent the device arranged as a right-hand cultivator; but when it is desired to convert it into a left-hand cultivator I detach the handles B and braces and standards and turn the frame A the opposite side up, as shown in Fig. 3, and again attach the handles, braces, and standards, and thus produce a left-hand machine.

The cultivator thus constructed is cheap, strong, and simple; capable of easy adjustment and transformation to a right or left hand machine.

Having thus described my invention, what I claim is—

A cultivator consisting of the reversible frame A, constructed as described, having the pivoted standards $g$ and adjustable braces $i$, and the adjustable handles B, connected thereto, all as herein described.

WILLIAM BENJAMIN READ.

Witnesses:
  W. G. POND,
  M. G. RHOADS.